March 26, 1963   A. MOREAU   3,082,500
WIRE ROPE SOCKETS OR SLEEVES
Filed Oct. 23, 1959
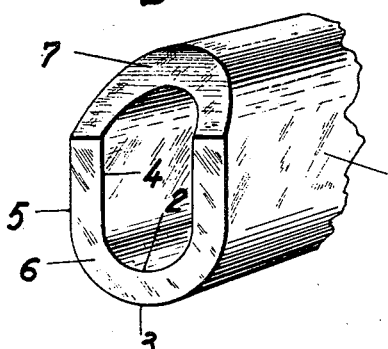
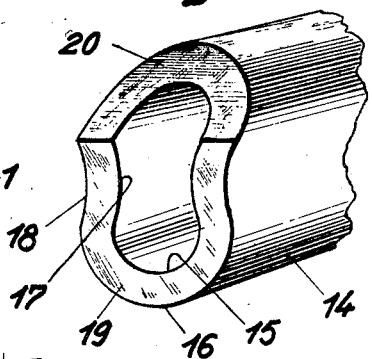
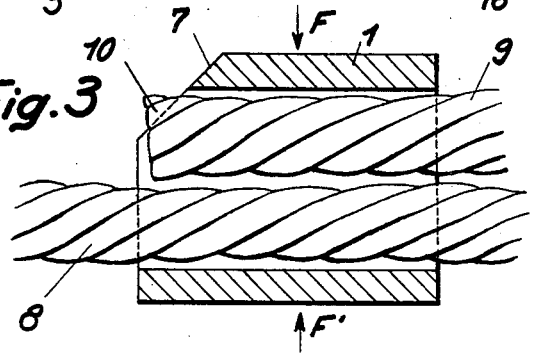
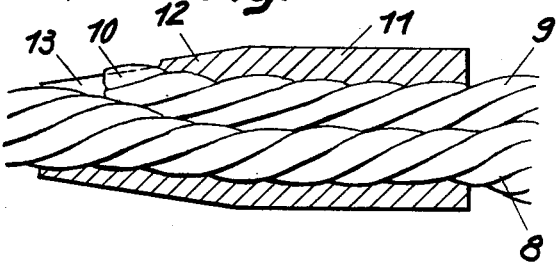
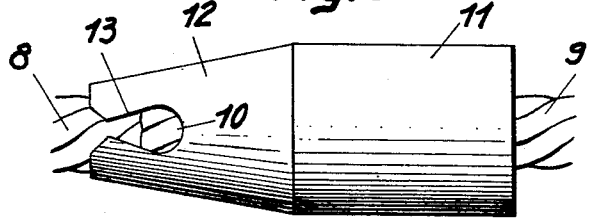
INVENTOR
ANDRÉ MOREAU
By Linton and Linton
ATTORNEYS

United States Patent Office 3,082,500
Patented Mar. 26, 1963

3,082,500
WIRE ROPE SOCKETS OR SLEEVES
André Moreau, Paris, France, assignor, by mesne assignments, to Inventions Finance Corporation, a corporation of Delaware
Filed Oct. 23, 1959, Ser. No. 848,390
Claims priority, application France Nov. 3, 1958
2 Claims. (Cl. 24—123)

In order to effect the joining of the two ends of a loop or eye formed in a wire rope, such as the eye splice of a sling, a socket or sleeve, preferably of aluminum alloy, is passed over the two rope portions that form the eye and is swaged thereon in such a manner that the surface of said portions is impressed in the metal of the sleeve, the turned-back end of the rope being lodged in said sleeve. After swaging the sleeve may be either cylindrical or tapered in form, but taper swaging gives the most effective form as it presents no sharp edges and enables the eye to move easily under the load.

By current procedure it is not possible to verify the exact position of the turned-back end of the rope in the sleeve after taper swaging the latter. Consequently it is impossible to be certain that the swaging is completely secure since the turned-back end may in some instances have been gripped over only a very short length, insufficient to make a reliable connection.

In addition, in its current form, it is found that the swaged sleeve becomes slightly oval as a result of which the metal is thinner at the sides.

In order to remedy these defects the present invention comprises a metal sleeve joining the two portions of a wire rope that form an eye, which has at the end of the sleeve farthest from the loop or eye a slanting cut or scarf exposing an opening through which the rope end remains visible after the sleeve is in place. This slanting cut or scarf is advantageously made of less depth than one half the diameter of the sleeve, preferentially about one third thereof.

Other features of the invention will become apparent from the following description aided by the accompanying drawings which show by way of example some embodiments thereof.

FIG. 1 is a fragmentary perspective view of one form of wire rope sleeve in accordance with the invention before fitting over the rope.

FIG. 2 is a fragmentary perspective view of another form of wire rope sleeve in accordance with the invention again before fitting over the rope.

FIG. 3 is a sectional elevation of the wire rope sleeve of FIG. 1 or 2 fitted in place over the two portions of the rope forming a loop or eye and before the sleeve is swaged round those portions.

FIG. 4 is an elevation similar to that in FIG. 3 after the sleeve has been swaged over the two portions of the rope, i.e. after taper swaging.

FIG. 5 is an external top view of the sleeve shown in FIG. 4.

In the form illustrated by FIG. 1, the sleeve 1 is of the usual section incorporating upper and lower rounds 2 and 3 connected by the flat cheeks 4 and 5, but at its end 6 farthest from the loop or eye formed in the rope a slanting cut or scarf 7 is made.

As shown in FIG. 3, the portions 8 and 9 of the rope that form the eye are introduced into the sleeve 1 in such a manner that the extremity 10 of the rope end 9 is visible through the opening made by the oblique cut or scarf 7. Thereupon, in the usual manner, the sleeve is compressed between the two jaws of an hydraulic press, in the direction of the arrows F and F' sufficiently to become shaped as shown in FIG. 4. The sleeve then presents a cylindrical barrel 11 and a tapered end 12, within which the rope portions 8 and 9 are gripped.

The tapered end 12 of the sleeve has in one side of the scarf 7 an opening 13 through which the extremity 10 of the rope end 9 is visible. It is therefore easy to verify the position of the turned-back end of the rope and confirm that the whole length of this end is gripped in the sleeve in such a manner that the sleeve affords a completely secure and safe connection.

If sleeves in accordance with FIG. 1 are used they will, after compression by the jaws of the press, exhibit burring or beading of considerable extent on either side of the cheek surfaces 5 thus reducing the thickness of the metal in the latter. This is avoided in the form shown in FIG. 2 where the sleeve 14 is of oval section having two, externally-convex bottom and top rounds 15 and 16, these being connected by two rounds 17 and 18 tangent to the preceding and forming externally concave cheeks; the sleeve also has at its end 19 farthest from the loop or eye an oblique cut or scarf 20 for the same purpose as the scarf 7 in FIG. 1.

When compressed in the press jaws the external rounds 18 are eliminated sometimes giving rise to the appearance internally of two very small folds or laps which practically do not weaken the sleeve, while the internal rounds 17 produce internal projections of the metal which grip the sides of the two rope portions that form the eye.

It will be evident that within the scope of the present invention it is possible to introduce modifications in the exemplary and non-restrictive forms or embodiments herein described and illustrated.

I claim:
1. In combination: a twisted strand metal rope having a free end brought parallel with and superimposed upon a portion of the rope to form an eye; and a sleeve of metal softer than that of the rope and having an unobstructed bore therethrough to receive the superimposed rope portions, said sleeve surrounding the superimposed portions of the rope and being swaged into compressive contact with said superimposed portions to maintain said portions in contacting relation with each other, the internal bore of said sleeve being unobstructed at the end thereof which is remote from the eye in said rope to permit passage of the free end of the rope therein, and said sleeve having at said remote end thereof a slanting scarf intersecting the internal bore of said sleeve receiving said free end of the rope to provide a transverse inspection opening for the free end of the rope.

2. In combination: a twisted strand metal rope having a free end brought parallel with and superimposed upon a portion of the rope to form an eye; and a sleeve of metal softer than that of the rope and having an unobstructed bore therethrough to receive the superimposed rope portions, said sleeve surrounding the superimposed portions of the rope and being swaged into compressive contact with said superimposed portions to maintain said portions in contacting relation with each other and with the interior surface of said sleeve conforming at least substantially to the twisted strands of said rope, the internal bore of said sleeve being unobstructed at the end thereof which is remote from the eye in said rope to permit passage of the free end of the rope therein, and said sleeve having at said remote end thereof a scarf intersecting the internal bore of said sleeve receiving said free end of the rope to provide a transverse inspection opening for the free end of the rope.

References Cited in the file of this patent

UNITED STATES PATENTS

| | | |
|---|---|---|
| 307,806 | Sailer | Nov. 11, 1884 |
| 1,422,660 | Bump | July 11, 1922 |
| 1,751,762 | Schoenberger | Mar. 25, 1930 |
| 2,017,887 | Blackburn | Oct. 22, 1935 |
| 2,151,609 | Menderman | Mar. 21, 1939 |
| 2,327,683 | Warner et al. | Aug. 24, 1943 |
| 2,881,496 | Wernsing | Apr. 14, 1959 |

FOREIGN PATENTS

| | | |
|---|---|---|
| 562,489 | France | Sept. 6, 1923 |
| 1,052,186 | Germany | Mar. 5, 1959 |
| 631,864 | Great Britain | Nov. 11, 1949 |